United States Patent [19]

Adachi et al.

[11] Patent Number: 5,583,581
[45] Date of Patent: Dec. 10, 1996

[54] DEFLECTION DISTORTION CORRECTING CIRCUIT

[75] Inventors: Toshiya Adachi; Miki Fukada, both of Kyoto, Japan

[73] Assignee: Mitsubishi Denki Kabushiki Kaisha, Tokyo, Japan

[21] Appl. No.: 493,700

[22] Filed: Jun. 22, 1995

[30] Foreign Application Priority Data

Jul. 6, 1994 [JP] Japan ................................ 6-154923

[51] Int. Cl.⁶ ........................... H04N 3/22; H04N 3/23
[52] U.S. Cl. .......................... 348/806; 315/370; 315/371
[58] Field of Search ........................... 348/806, 807, 348/745–747, 704; 315/370, 371, 368.21, 368.22, 368.23; H04N 3/22, 3/23, 3/26, 3/233, 3/237

[56] References Cited

U.S. PATENT DOCUMENTS

| | | | |
|---|---|---|---|
| 4,673,986 | 6/1987 | Jenness | 348/806 |
| 4,706,115 | 11/1987 | Colineau et al. | 348/746 |
| 4,719,392 | 1/1988 | Haferl | 315/370 |
| 4,754,204 | 6/1988 | Ando et al. | 348/807 |
| 4,827,193 | 5/1989 | Watanaki et al. | 315/371 |
| 4,968,919 | 11/1990 | Oliver | 315/371 |
| 5,016,095 | 5/1991 | Kii | 348/806 |

FOREIGN PATENT DOCUMENTS

| | | | |
|---|---|---|---|
| 0503915 | 9/1992 | European Pat. Off. | H04N 3/23 |
| 715692 | 1/1995 | Japan . | |

*Primary Examiner*—Michael H. Lee

[57] ABSTRACT

A deflection distortion correcting circuit which produces a predetermined parabolic wave as an output of an integration circuit previously correcting data used for producing the parabolic wave.

38 Claims, 14 Drawing Sheets

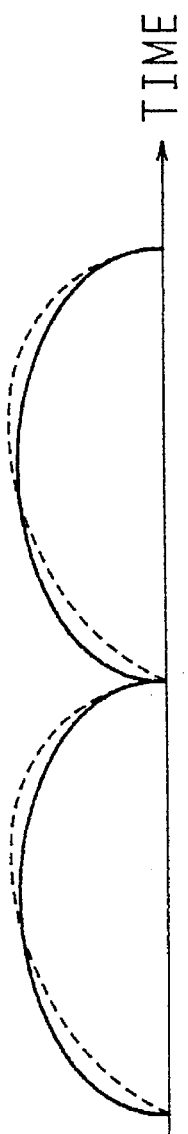

FIG. 6A
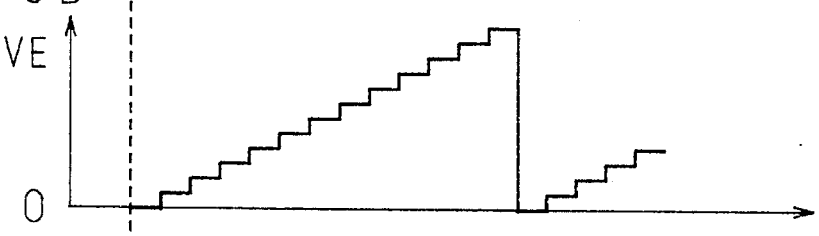
FIG. 6B
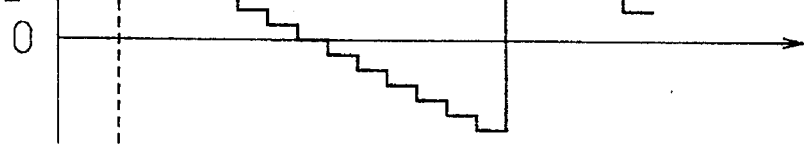
FIG. 6C
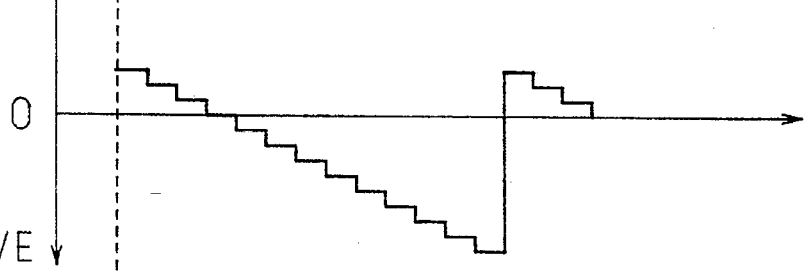
FIG. 6D
FIG. 6E
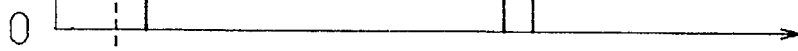

DEFLECTION DISTORTION CORRECTING CIRCUIT

BACKGROUND OF THE INVENTION

1. Field of the Invention

The present invention relates generally to a circuit for correcting a deflection distortion, and more particularly, to a circuit for generating a parabolic wave used for correcting a deflection distortion in an image display apparatus having a cathode ray tube.

2. Description of the Background Art

FIG. 1 is a block diagram showing the conventional deflection distortion correcting circuit used in an image display apparatus having a cathode ray tube. FIG. 2 is a circuit diagram of an integration circuit which is coupled to a PWM circuit 11 shown in FIG. 1. FIGS. 3A, 3B, 3C, 3D, 4A, 48 and 4C are waveform charts of outputs from main circuits constituting the deflection distortion correcting circuit:

Basic clock pulses generated by a basic clock generator are inputted into a frequency divider 2 through a basic clock input terminal 1. The frequency divider 2 divides the frequency of the basic clock pulse by N (N: an integer). The output of the frequency divider 2 is a pulse signal as shown in FIG. 3A. The basic clock pulse having the divided frequency is inputted into a counter 3 and a flip-flop circuit 8. A vertical synchronizing signal is separated from an image signal which is received by the image display apparatus. The separated vertical synchronizing signal is inputted into the counter 3 through an input terminal 4. The counter 3 counts up the output pulses of the frequency divider 2 over one vertical scanning period. The counter 3 is reset at every rise of the vertical synchronizing signal. The counter 3 outputs an upward step-like signal as shown in FIG. 3B. The count value is outputted to a subtracter 6.

A center value which is previously set for determining the period of the parabolic wave is inputted into the subtracter 6 through an input terminal 5. The center value is specifically a value which represents the number of output pulses of the frequency divider 2 counted by the counter 3 during a period corresponding to a half of one vertical scanning period. The subtracter 6 subtracts the count value which is inputted from the counter 3, from the center value, and outputs the subtraction result to an adder 7. The subtracter 6 outputs a downward step-like signal as shown in FIG. 3C.

The adder 7 adds the output data from the subtracter 6 to the output data from the flip-flop circuit 8, and then outputs the addition result to the flip-flop circuit 8. The flip-flop circuit 8 determines the output of the adder 7 for each period of the output pulse of the frequency divider 2, and outputs the determined output to the adder 7 and an adder 10. The output from the flip-flop circuit 8 has a step-like waveform as shown in FIG. 3D, and has an arcuate waveform as a whole in each vertical scanning period.

The operation in which the output of the subtracter 6 is added to the output of the flip-flop circuit 8 in the adder 7 and the addition result is again determined by the flip-flop circuit 8 is repeatedly performed at a period of the output pulse of the frequency divider 2, so that the output of the subtracter 6 is gradually integrated.

The adder 10 receives control data for controlling the direct-current components of the parabolic wave, via an input terminal 9. The control data is added to the output data from the flip-flop circuit 8 in the adder 10. The addition result is outputted to a pulse width modulation (hereinafter abbreviated as PWM) circuit 11.

The PWM circuit 11 generates a PWM signal shown in FIG. 4B in which the pulse width is varied in accordance with the inputted added value. The PWM signal is outputted to an integration circuit 120 shown in FIG. 2. The integration circuit 120 is constructed by combining a resistance 120a with a capacitor 120b. The integration circuit 120 integrates the PWM signal or converts the PWM signal into a smooth parabolic wave shown in FIG. 4C, and outputs the parabolic wave.

The thus obtained parabolic wave is processed so as to change the magnitude of a horizontal deflection current in the image display apparatus having a cathode ray tube. Thus, deflection distortion is corrected.

In the above-described prior art deflection distortion correcting circuit, however, when the PWM signal is converted into the parabolic wave in the integration circuit 120, the waveform is distorted, for example, as shown by a broken line in FIG. 4C, by the influence of the time delay of the integration circuit. This produces a problem in that it is difficult to obtain a predetermined parabolic wave indicated by a solid line in FIG. 4C.

SUMMARY OF THE INVENTION

The present invention is directed to solve the above-mentioned problems. Accordingly, it is a first object of the invention to provide a deflection distortion correcting circuit adapted for obtaining a predetermined parabolic wave as an output of an integration circuit by previously correcting the data used for generating the parabolic wave.

To achieve this object, according to one aspect of the invention, a first difference between a first reference value for determining the period of a basic parabolic wave and a count value, and a second difference between a second reference value for determining the period of a correcting-use parabolic wave and the count value are respectively obtained. The first difference and the second difference are independently integrated, and then a sum of the integrated values is obtained. Thus, the basic parabolic wave data and the correcting-use parabolic wave data are produced, and these data are added up. As a result, a predetermined parabolic wave subjected to prior correction can be obtained as an output of the integration circuit.

According to another aspect of the present invention, the first difference is added to the second difference, and the totalled value is integrated. Thus, a corrected parabolic wave can be obtained.

It is second object of the present invention to provide a deflection distortion correcting circuit in which the amplitude of a parabolic wave to be outputted can voluntarily be controlled by providing each of the basic parabolic wave and the correcting-use parabolic wave with amplitude gains.

To achieve this object, according to the present invention, in either of the above-mentioned deflection distortion correcting circuits, a first difference is obtained in the form of a difference between a value obtained by multiplying a count value by a first amplitude gain and a value obtained by multiplying a first reference value by the first amplitude gain. Likewise, a second difference is obtained in the form of a difference between a value obtained by multiplying the count value by a second amplitude gain and a value obtained by multiplying a second reference value by the second amplitude gain. As a result, the amplitude of the parabolic wave to be outputted can voluntarily be set and controlled.

It is a third object of the invention to provide a deflection distortion correcting circuit in which a required process is conducted by time-division multiplexing first and second reference values for determining the waveform of a parabolic wave, and the values are then separated into a first difference and a second difference, whereby simplifying the processing.

To achieve this object, according to the present invention, the first and second reference values are time-division multiplexed, and first and second time-division multiDlexed differences between the respective time-division multiplexed values and a count value are then obtained. The separation of the first and second time-division multiplexed differences into a first difference and a second difference simplifies the processing.

It is a fourth object of the invention to provide a deflection distortion correcting circuit in which a first reference value functioning as the center value data for a basic parabolic wave is obtained by internal processing, thereby simplifying an external circuit.

To achieve this object, according to the present invention, a basic clock pulse is previously counted over one vertical scanning period. First and second reference values are calculated in accordance with the counted count value. Therefore, the first and second reference values can be obtained in the internal circuit. When the basic clock pulses counted for each of a plurality of vertical scanning periods and the first and the second reference values are obtained by using a mean value of the counted values, the accuracy of each reference value can be improved.

It is a fifth object of the invention to provide a deflection distortion correcting circuit in which a timing of applying correcting data to a basic parabolic wave can voluntarily be set.

To achieve this object, according to the present invention, on the basis of the information of time at which the correction is to be started, the correcting-use parabolic wave data is added at a given position of the basic parabolic wave data. Accordingly, it is possible to output a parabolic wave having an arbitrary amplitude at a desired timing.

It is a sixth object of the invention to provide a deflection distortion correcting circuit in which a gain adjustment can be performed by compressing or amplifying the whole of parabolic wave data after completing the correction.

To achieve this object, according to the present invention, the deflection distortion correcting circuit comprises a means for compressing or amplifying a sum of integrated values of the first difference and the second difference, or an integrated value of a sum of the first difference and the second difference, at an arbitrary rate. Accordingly, it is possible to adjust the amplitude gain for the entire parabolic wave over a wide range.

The above and further objects and features of the invention will more fully be apparent from the following detailed description with accompanying drawings.

BRIEF DESCRIPTION OF THE DRAWINGS

FIG. 4A is a waveform chart showing basic clock pulses.

FIG. 4B is a waveform chart showing a PWM signal;

FIG. 4C is a waveform chart showing a parabolic wave;

FIG. 6A is a waveform chart showing an output waveform of a frequency divider in Embodiment 1;

FIG. 6B is a waveform chart showing an output waveform of a counter in Embodiment 1;

FIG. 6C is a waveform chart showing an output waveform of a subtracter in Embodiment 1;

FIG. 6D is a waveform chart showing an output waveform of a subtracter in Embodiment 1;

FIG. 6E is a waveform chart showing an output waveform of an adder in Embodiment 1;

DESCRIPTION OF THE PREFERRED EMBODIMENTS

Hereinafter, the invention will be described in detail with reference to the accompanying drawings showing embodiments:

EMBODIMENT 1

Figure 5:
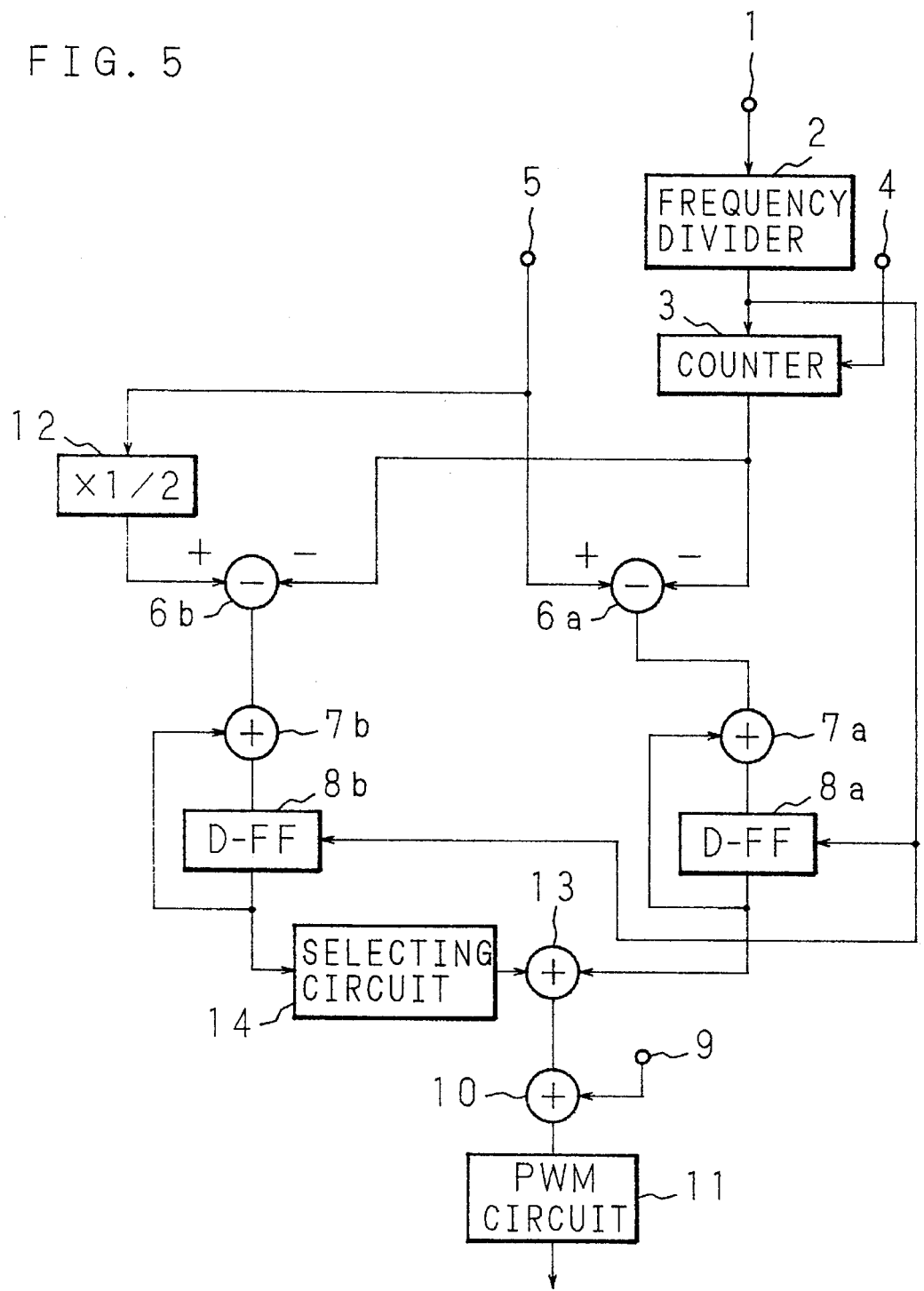
FIG. 5 is a block diagram showing the configuration of Embodiment 1.

FIG. 5 is a block diagram showing the configuration of a deflection distortion correcting circuit of the invention. FIGS. 6A, 6B, 6C, 6D and 6E are waveform charts showing output waveforms of main circuits constituting the deflection distortion correcting circuit. Referring to FIGS. 5 and 6, a suffix "a" indicates that the corresponding component belongs to a circuit for generating a basic parabolic wave, and a suffix "b" indicates that the corresponding component belongs to a circuit for generating a correcting-use parabolic wave.

Basic clock pulses generated in a basic clock generator are inputted into a frequency divider 2 through a basic clock input terminal 1. In the frequency divider 2, the frequency of the basic clock pulse is divided by N (N: an integer). The output of the frequency divider 2 is a pulse signal as shown in FIG. 6A. The basic clock pulse having the divided frequency is inputted into a counter 3 and flip-flops (D-FFs) 8a and 8b.

A vertical synchronizing signal is separated from an image signal received by an image display apparatus, and then inputted into the counter 3 through an input terminal 4. The counter 3 counts up the output pulses of the frequency divider 2 over one vertical scanning period, and is reset at every rise of the vertical synchronizing signal. The counter 3 outputs an upward step-like signal as shown in FIG. 6B. The count value is outputted to subtracters 6a and 6b.

A center value functioning as a first reference value which is a factor for determining the period of a predetermined parabolic wave is inputted into the subtracter 6a through an input terminal 5. Also, the center value is compressed by a compression circuit 12, and then inputted into the subtracter 6b. Specifically, the center value is a count value obtained as a result of a count operation in which the output pulse of the frequency divider 2 is counted for a period corresponding to a half of a vertical scanning period. The subtracter 6a subtracts the count value of the counter 3 from the center value, and outputs the subtraction result to an adder 7a. The subtracter 6b subtracts the count value of the counter 3 from a second reference value which is obtained by compressing the center value to ½ by the compression circuit 12, and the subtraction result is outputted to an adder 7b. The output of the subtracter 6a is shown in FIG. 6C, and the output of the subtracter 6b is shown in FIG. 6D. These outputs are downward step-like signals.

The adder 7a (7b) adds the input from the subtracter 6a (6b) to the output from the flip-flop circuit 8a (8b). The added value is outputted to the flip-flop circuit 8a (8b). The flip-flop circuits 8a and 8b use the output pulse from the frequency divider 2 as an enable signal. The flip-flop circuit 8a obtains basic parabolic wave data by determining the output of the adder 7a for each output pulse, and outputs the basic parabolic wave data to the adder 7a and an adder 13. The flip-flop circuit 8b determines the output of the adder 7b for every output pulse, so as to obtain correcting-use parabolic wave data. The correcting-use parabolic wave data is outputted to the adder 7b and a selecting circuit 14. The selecting circuit 14 is constituted so that, when the value of the correcting-use parabolic wave data is positive (including 0), the value is directly outputted, and, when the value is negative, a value of 0 is outputted regardless of the magnitude of the negative value.

The respective data of the flip-flop circuits 8a and 8b fed back to the adders 7a and 7b are added to the subtracted values outputted from the subtracters 6a and 6b in the adders 7a and 7b. The addition results are again supplied to the flip-flop circuits 8a and 8b, respectively. This process is repeated at a period of the output pulse of the frequency divider 2. As a result, the subtracted values of the respective subtracters 6a and 6b are integrated separately from each other.

The adder 13 adds the basic parabolic wave data outputted from the flip-flop circuit 8a to the correcting-use parabolic wave data outputted from the selecting circuit 14. The addition result is outputted to an adder 10. As shown in FIG. 6E, the output of the adder 13 has a step-like waveform, but has an arcuate waveform as a whole. The adder 10 receives control data for controlling the direct current components of the parabolic wave, through an input terminal 9. The adder 10 adds the control data to the corrected parabolic wave data outputted from the adder 13. Thus, parabolic wave data having controlled direct current components is produced, and the data is outputted to a PWM circuit 11.

Figure 1:
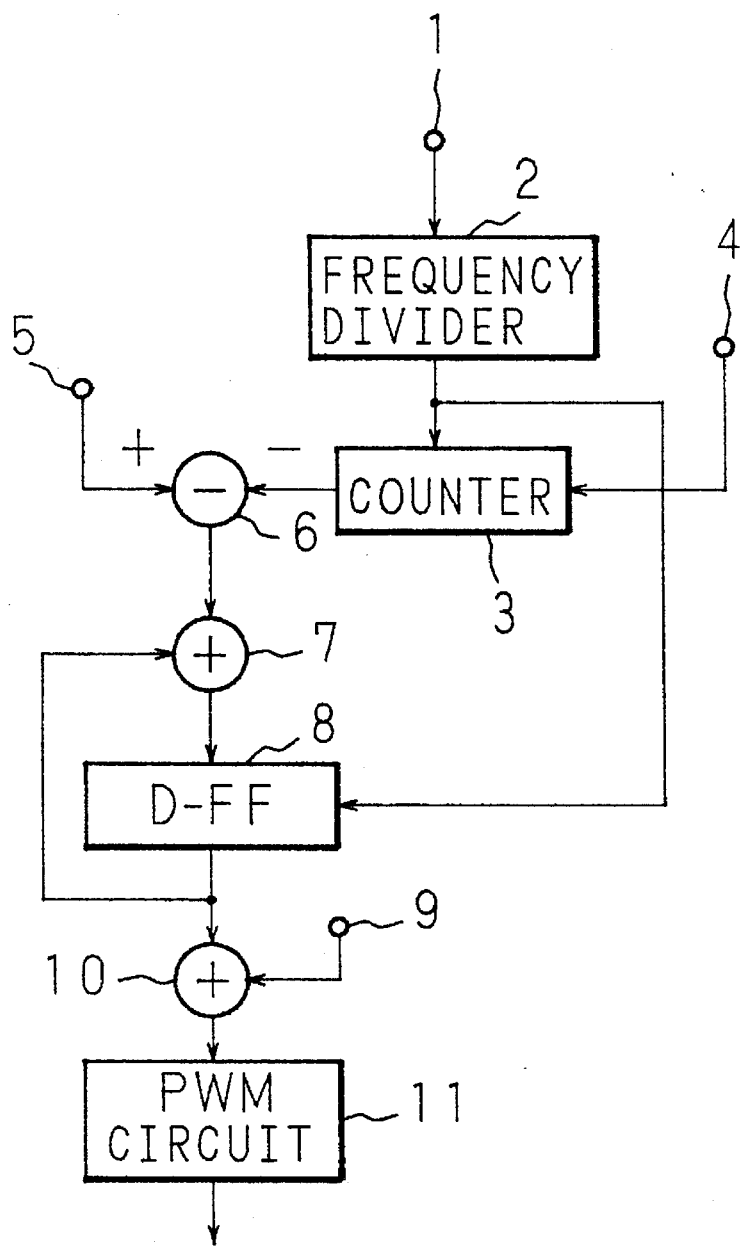
FIG. 1 is a block diagram showing a conventional deflection distortion correcting circuit.
Figure 2:
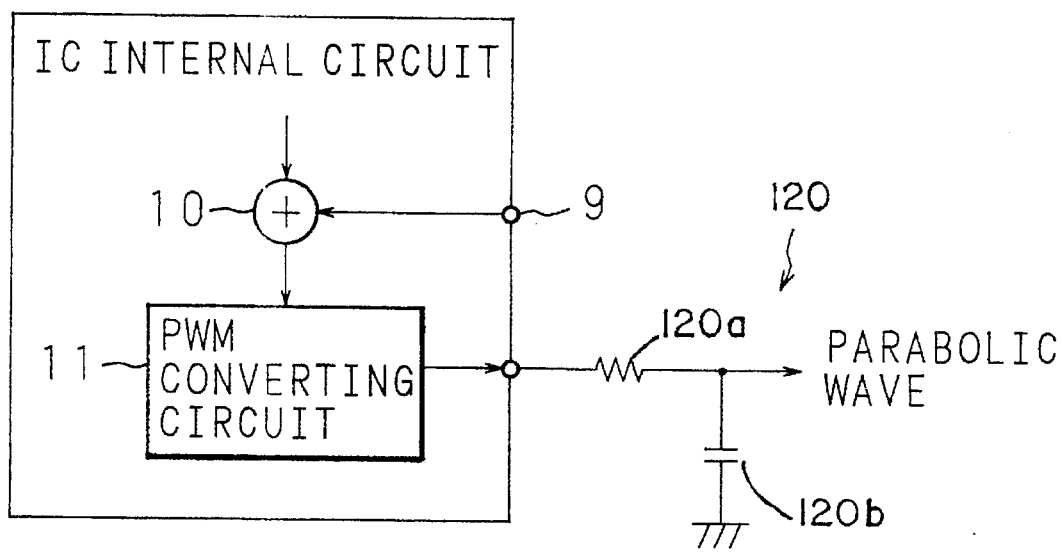
FIG. 2 is a circuit diagram of a circuit for integrating a PWM signal from the conventional deflection distortion correcting circuit shown in FIG. 1.
Figure 3A:
FIG. 3A is a waveform chart showing an output waveform of a frequency divider in the conventional deflection distortion correcting circuit.
Figure 3B:
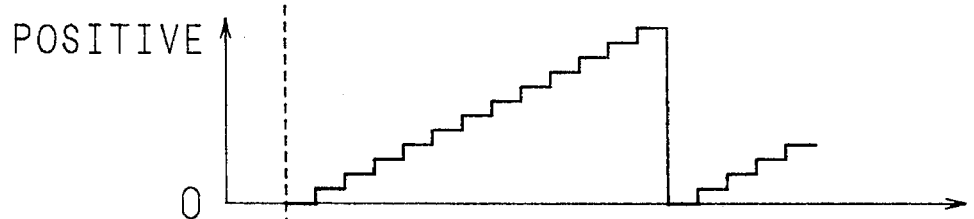
FIG. 3B is a waveform chart showing an output waveform of a counter in the conventional deflection distortion correcting circuit.
Figure 3C:
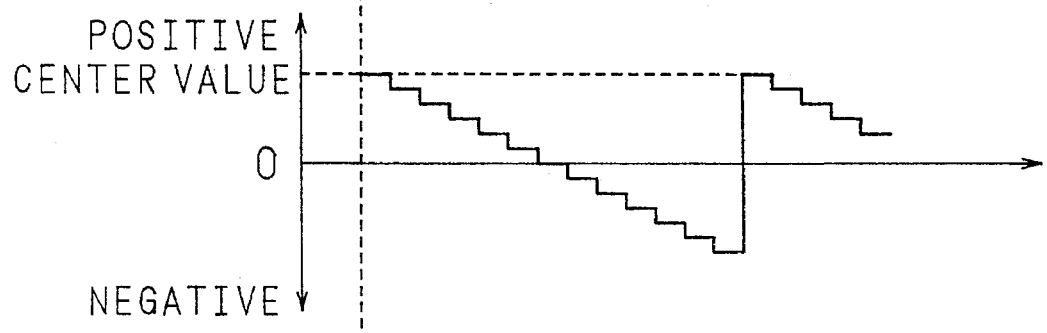
FIG. 3C is a waveform chart showing an output waveform of a subtracter in the conventional deflection distortion correcting circuit.
Figure 3D:
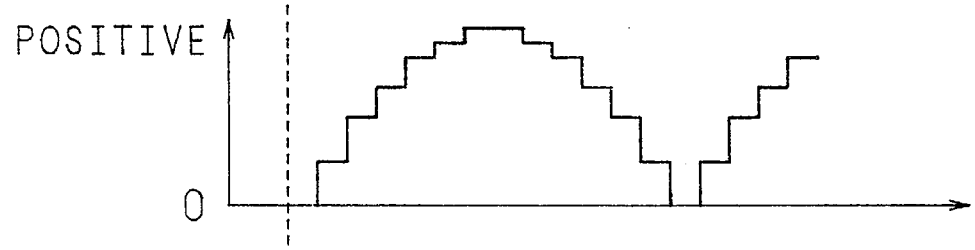
FIG. 3D is a waveform chart showing an output waveform of a flip-flop circuit in the conventional deflection distortion correcting circuit.

The PWM circuit 11 generates a PWM signal having a pulse width which is varied in accordance with the inputted added value, and outputs the PWM signal to an integration circuit. The integration circuit such as the integration circuit 120 as illustrated in FIG. 2, integrates the PWM signal, i.e., converts the PWM signal into a parabolic wave, and then outputs the parabolic wave.

By using the thus obtained parabolic wave, the magnitude of the horizontal deflection current in the image display apparatus having a cathode ray tube is varied, and deflection distortion is corrected.

In Emdodiment 1, the selecting circuit 14 controls the output of the correcting-use parabolic wave data outputted from the flip-flop circuit 8b. Specifically, when the value of the correcting-use parabolic wave data is positive (including 0), the selecting circuit 14 directly outputs the value to the adder 13. When the value is negative, the selecting circuit 14 outputs "0" regardless of the degree of the negative value. Accordingly, the adder 13 outputs corrected parabolic wave data. Consequently, the output of corrected parabolic wave data is more precisely controlled with the control for the direct-current components in the adder 10 and a parabolic wave in which the distortion caused by integrating is compensated is obtained, as shown by the solid line in FIG.4C.

EMBODIMENT 2

In Embodiment 2, the calculations in the process for producing the basic parabolic wave data and the process for producing the correcting-use parabolic wave data are conducted in reverse order to that in Embodiment 1.

Figure 7:
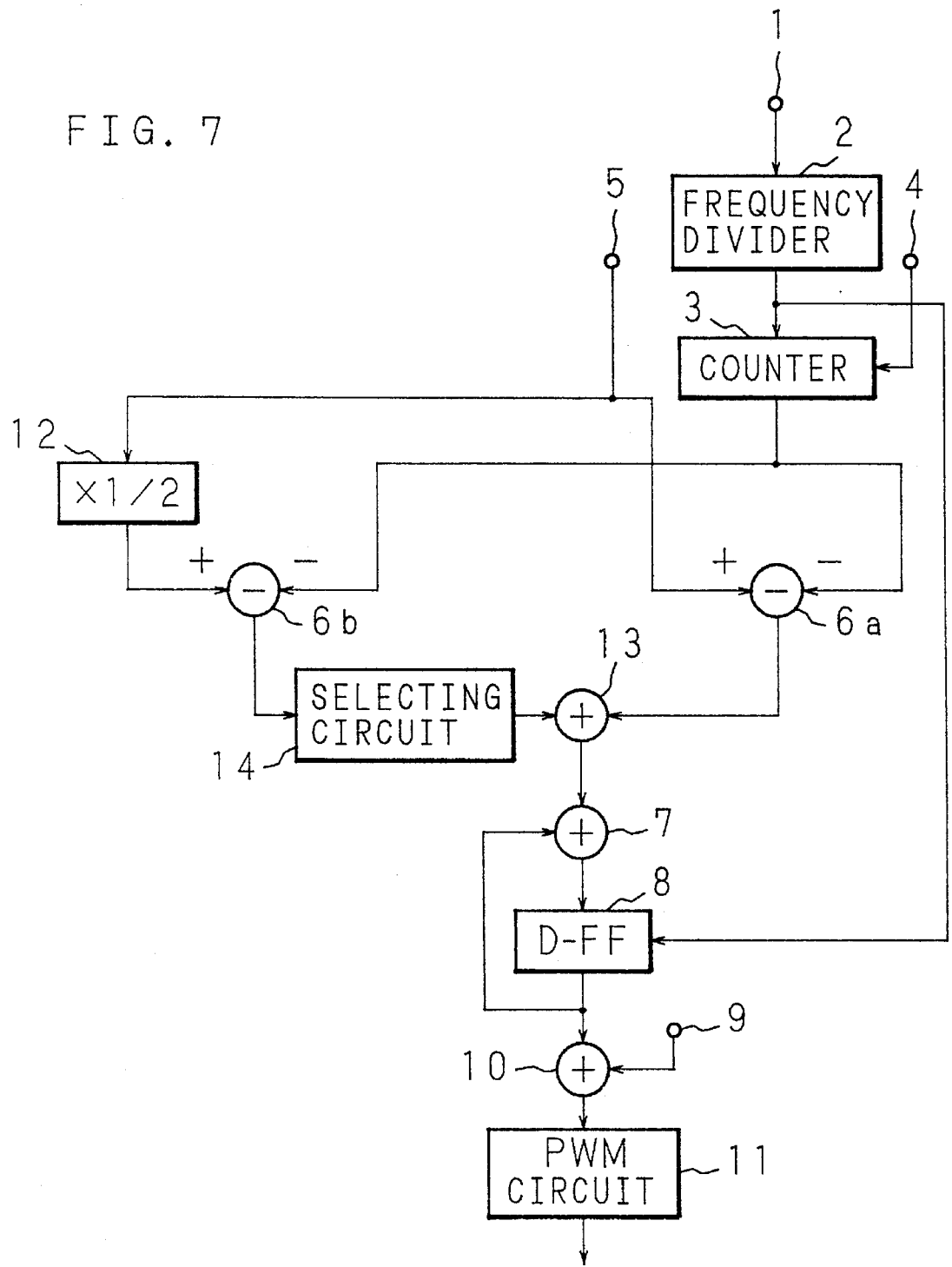
FIG. 7 is a block diagram showing the configuration of Embodiment 2.

FIG.7 is a block diagram showing the configuration of Embodiment 2. A subtracter 6a subtracts the count value of a counter 3 from the center value functioning as a first reference value which is inputted through an input terminal 5. The subtraction result is directly outputted to an adder 13. A subtracter 6b subtracts the counter value of the counter 3 from a second reference value which is a value obtained by compressing the aforementioned center value to ½ by a compression circuit 12. The subtraction result is outputted to the adder 13 via a selecting circuit 14. The adder 13 adds the output from the subtracter 6a to the output from the selecting circuit 14, and then outputs the addition result to an adder 7. This process means that the basic parabolic wave data is corrected by the correcting-use parabolic wave data.

The adder 7 adds the output from the adder 13 to the output from a flip-flop circuit 8, and outputs the addition result to the flip-flop circuit 8. The flip-flop circuit 8 determines the output of the adder 7 for each period of the output pulse from a frequency divider 2, and produces corrected parabolic wave data. The corrected data is outputted to the adder 7 and an adder 10.

The other components and functions are substantially equivalent to those of Emdodiment 1. Like reference numerals designate like components to those in Emdodiment 1, and description of the components is omitted for simplicity.

In Emdodiment 2, as compared with Emdodiment 1, only one adder 7 and one flip-flop circuit 8 are provided. This means that the configuration which is simpler than that of Emdodiment 1 can attain substantially the same effects.

EMBODIMENT 3

In order to control the amplitude of a parabolic wave to be outputted, a detection distortion correcting circuit in Emdodiment 3 is configured so that the amplitude gains of the basic parabolic wave and the correcting-use parabolic wave are voluntarily determined.

Figure 8:
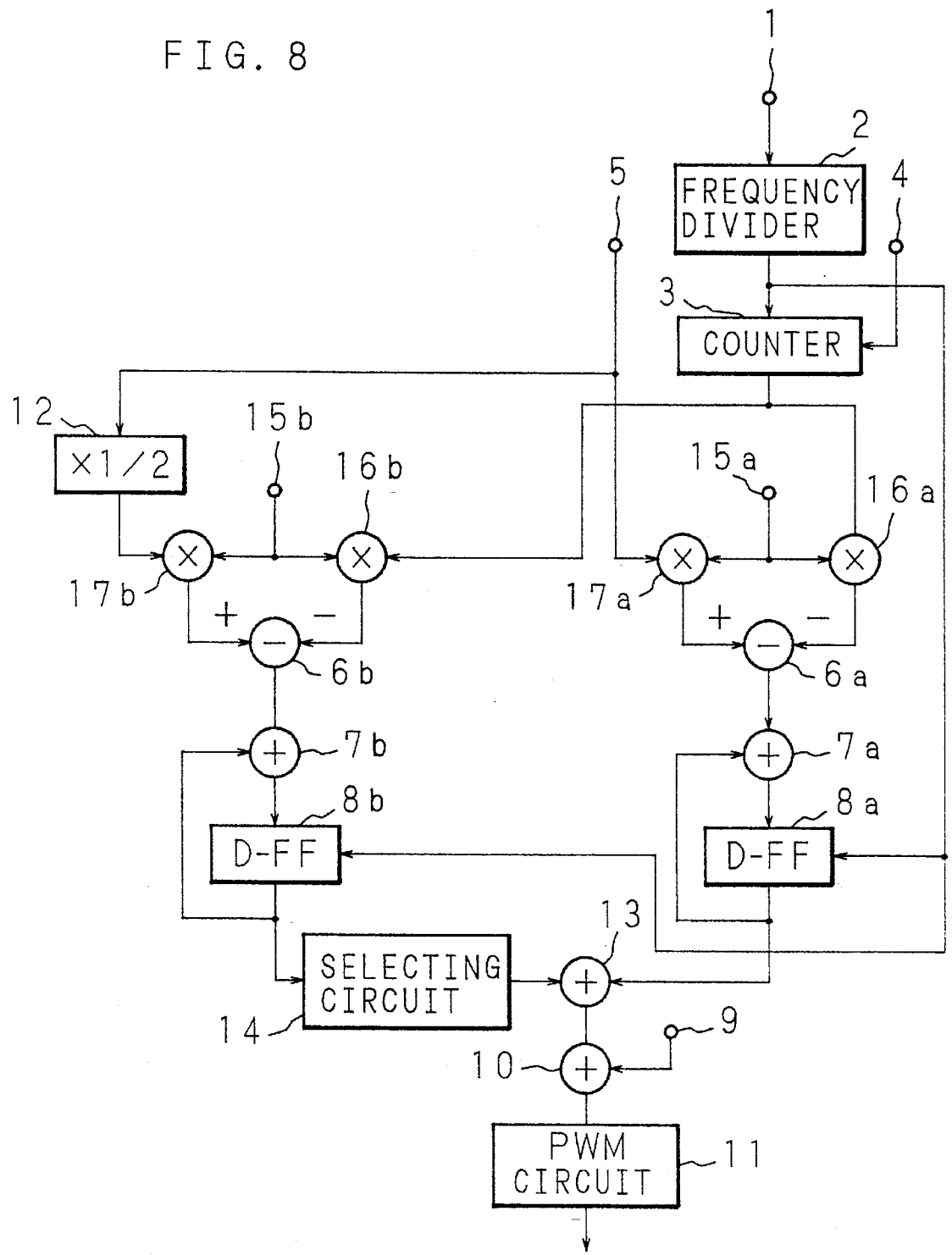
FIG. 8 is a block diagram showing fie configuration of Embodiment 3.

FIG.8 is a block diagram showing the configuration of Emdodiment 3. A counter 3 counts up the output pulses of the frequency divider 2 over a vertical scanning period, and outputs the count value to multipliers 16a and 16b at each end of the period. The center value which functions as a first reference value and is inputted through an input terminal 5 is directly inputted into a multiplier 17a, and also input into a multiplier 17b via a compression circuit 12.

The multipliers 16a and 17a receive the amplitude gain for basic parabolic wave data through an input terminal 15a. The multiplier 16a multiplies the count value from the counter 3 by the amplitude gain from the input terminal 15a, and outputs the multiplied value to a subtracter 6a. The multiplier 17a multiplies the center value from the input terminal 5 by the amplitude gain from the input terminal 15a, and outputs the multiplied value to the subtracter 6a. The subtracter 6a subtracts the multiplied value obtained in the multiplier 16a, from the multiplied value obtained in the multiplier 17a, and outputs the subtracted value to an adder 7a.

The multipliers 16b and 17b receive the amplitude gain for correcting-use parabolic wave data through an input terminal 15b. The multiplier 16b multiplies the count value from the counter 3 by the amplitude gain from the input terminal 17b, and outputs the multiplied value to a subtracter 6b. The multiplier 17b multiplies the center value of the correcting-use parabolic wave functioning as a second reference value obtained by compressing the center value to ½ in the compression circuit 12, by the amplitude gain input through the input terminal 15b. The multiplied value is outputted to the subtracter 6b. The subtracter 6b subtracts the multiplied value of the multiplier 16b from the multiplied value of the multiplier 17b, and outputs the subtracted value to an adder 7b.

The other components are substantially equivalent to those of Emdodiment 1. Like reference numerals designate like components to those of Emdodiment 1, and the description of the components is omitted for simplicity.

In Emdodiment 3, prior to the production of each of the basic parabolic wave data and the correcting-use parabolic wave data by the flip-flop circuits 8a and 8b, the counter value of the counter 3 and the center value are respectively multiplied by the amplitude gains, so as to independently change the amplitude of the basic parabolic wave data and that of the correcting-use parabolic wave data. As a result, the amplitude of the parabolic wave for correcting deflection distortion to be outputted can locally be changed.

Emdodiment 3 shows such a configuration that the multipliers 16a, 16b, 17a and 17b for respectively multiplying the center value and the counter value by the amplitude gains are disposed in preceding stages of the subtracters 6a and 6b. Alternatively, these multipliers my respectively be disposed between the subtracter 6a and the adder 7a, and between the subtracter 6b and the adder 7b, with the result that the same effects are attained.

As an alternative embodiment, the multipliers 16a, 16b, 17a, and 17b can be combined with the subtractors 6a and 6b of Embodiment 2, shown in FIG. 7, in a manner similar to Embodiment 3 shown in FIG. 8

EMBODIMENT 4

In Embodiments 1 to 3 two sets of similar circuits are used for producing two kinds of data, i.e., the basic parabolic wave data and the correcting-use parabolic wave data, and the same input data is externally supplied to each of the sets, but Emdodiment 4 is provided with a selection switch is provided for selectively inputting data which is externally supplied, in accordance with the input of a reference signal. Accordingly, Emdodiment 4 can attain the time-division multiplex.

Figure 9:
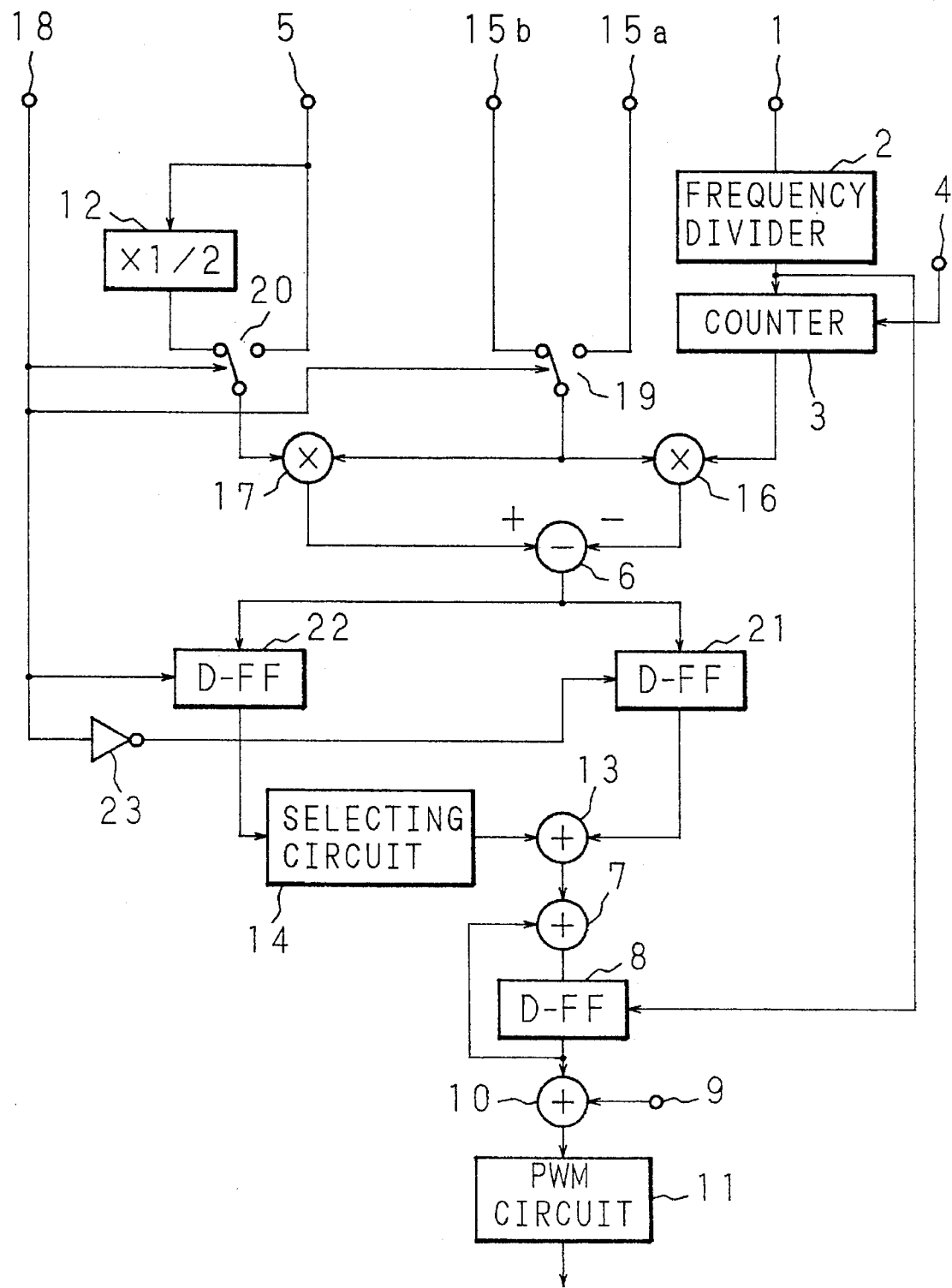
FIG. 9 is a block diagram showing the configuration of Embodiment 4.

FIG.9 is a block diagram showing the configuration of Emdodiment 4. A count value of a counter 3 is supplied to one input terminal of a multiplier 16, and one of the amplitude gains from input terminals 15a and 15b is selectively supplied to the other input terminal of the multiplier 16 via a selection switch 19. One of a center value functioning as a first reference value from an input terminal 5, and a second reference value obtained by compressing the center value to ½ in a compression circuit 12 is selectively supplied imput terminal of a multiplier 17 via a selection switch 20. The one of the amplitude gains from the input terminals 15a and 15b is supplied to the other input terminal of the multiplier 17 via the selection switch 19. The selection switches 19 and 20 are realized by multiplexers or the like.

The multiplied values obtained by the multipliers 16 and 17 are inputted into a subtracter 6. The subtracter 6 subtracts the multiplied value of the multiplier 16 from the multiplied value of the multiplier 17, and outputs the subtraction result to flip-flop circuits 21 and 22.

A waveform data switching signal which is supplied through an input terminal 18 is used for switching signals for the selection switches 19 and 20 and enable signals for the flip-flop circuits 21 and 22. The flip-flop circuit 21 receives a signal which is obtained by inverting the waveform data switching signal supplied through the input terminal 18 by means of an inverter 23. The input terminal 18 is connected to a circuit outputting a signal which is switched between a low level and a high level at every input of a basic clock pulse for the whole circuit. For example, a mode where the signal supplied to the input terminal 18 is at the low level is defined to be a basic parabolic wave mode, and that where the signal is at the high level is defined to be a correcting-use parabolic wave mode. With the above configuration, the selection switches 19 and 20 are switched synchronously with the level of the waveform data switching signal, and the data for setting the amplitude and the period of the basic parabolic wave or the correcting-use parabolic wave is alternately inputted into circuits for producing respective parabolic wave data (the multipliers 16 and 17, the subtracter 6, the flip-flop circuits 21 and 22, and the like).

The flip-flop circuits 21 and 22 use the waveform data switching signal or the signal which is obtained by inverting the signal by the inverter 23, as their enable signals. The flip-flop circuits 21 and 22 separate the basic parabolic wave data from the correcting-use parabolic wave data. The flip-flop circuit 21 directly outputs the obtained value to an adder 13. The flip-flop circuit 22 outputs the value to the adder 13 via a selecting circuit 14. The other components and operations are substantially equivalent to those of Emdodiment 2. Like reference numerals are used for indicating like components to those of Embodiment 2, and the description of the components is omitted.

In Emdodiment 4 two kinds of parabolic wave data are outputted in a time-division multiplexed form. The process in which data is time-division multiplexed is advantageous in that it necessitates only one multiplier 16, one multiplier 17, and one subtracter 6 which constitute the parabolic wave data producing circuit.

EMBODIMENT 5

In Embodiments 1 to 4, the center value functioning as the first and second reference values which are used as factors for determining the period of the parabolic wave is externally supplied. In Embodiment 5, the center value is not externally supplied, and the center-value data of the basic parabolic wave is previously obtained by allowing a counter to operate over one vertical scanning period, so that one parabolic wave is generated for one vertical scanning period.

Figure 10:
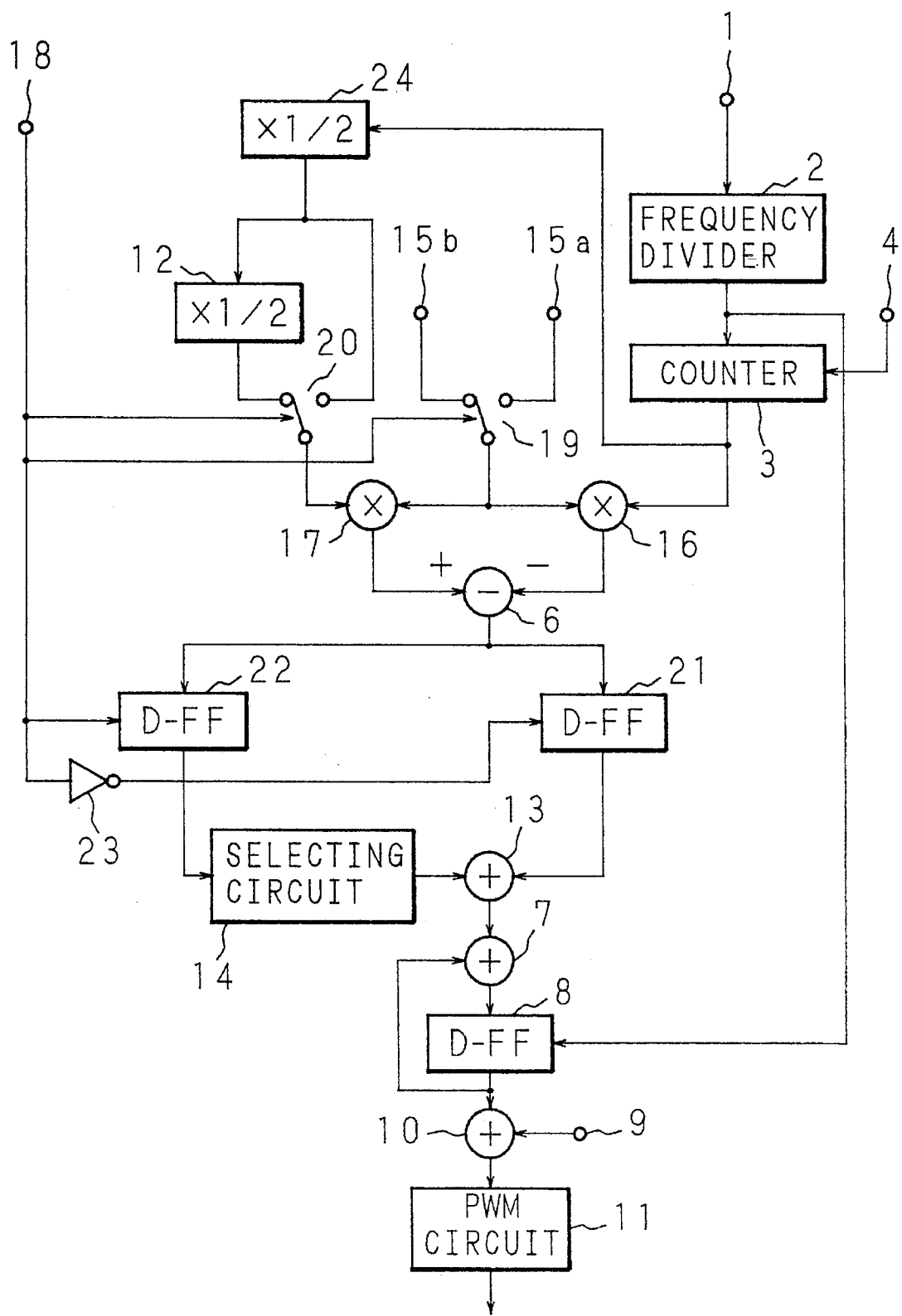
FIG. 10 is a block diagram showing the configuration of Embodiment 5.

FIG. 10 is a block diagram showing the configuration of Embodiment 5. A counter 3 operates over one vertical scanning period so as to count up the output pulse of a frequency divider 2. The counter 3 outputs the maximum count value which is obtained immediately before the reset, to a multiplier 16 and a center value calculating circuit 24.

The center value functioning as the factor for determining the period of the basic parabolic wave corresponds to a half of the maximum count value which is obtained immediately before the reset. Therefore, the center value calculating circuit 24 first removes the LSB (least significant bit) of the data from the maximum count value, and thereafter the maximum count value is shifted toward the LSB by 1 bit. The obtained value equals to a value which is obtained by multiplying the maximum count value by ½. The value is outputted to a selection switch 20 and a compression circuit 12.

The other components and operations are substantially equivalent to those of Embodiments 2 and 4. Like reference numerals are used for indicating like components to those of Embodiments 2 and 4, and the description of the components is omitted.

In Emdodiment 5 the center value functioning as the first and second reference values can be obtained as the result of the internal processing. Thus, the external circuit can be omitted, and it is possible to attain the same effects as those of Embodiments 1 to 4.

EMBODIMENT 6

In Emdodiment 6, a counter 3 performs the count operation for each of a plurality of vertical scanning periods. By using the maxims count value of each of the count operations, center-value data of the basic parabolic wave is obtained. Then, a mean value of these center-value data is obtained. By using the mean value, it is possible to calculate the first and second reference values with a reduced error level.

Figure 11:
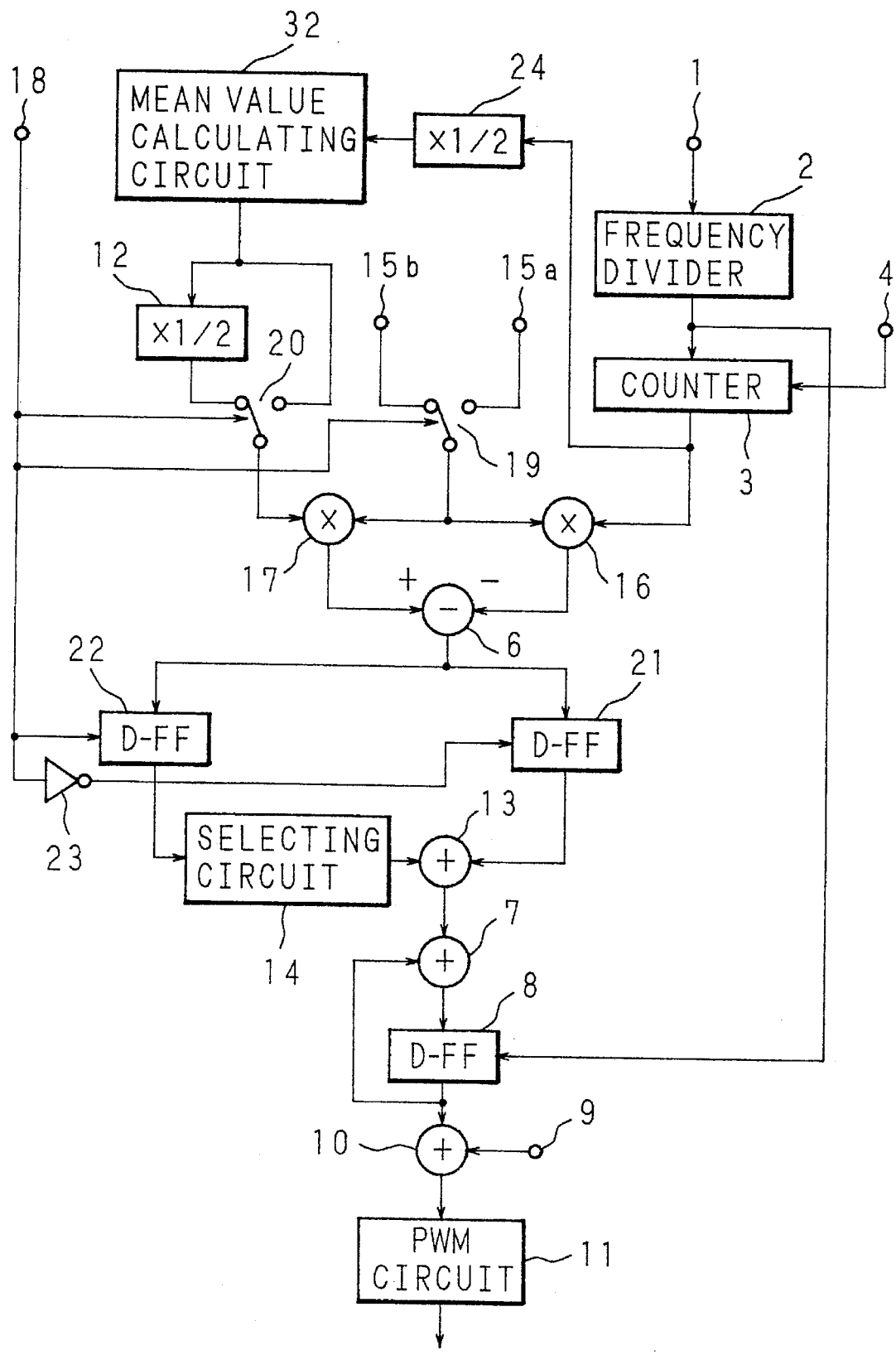
FIG. 11 is a block diagram showing the configuration of Embodiment 6.

FIG. 11 is a block diagram showing the configuration of Embodiment 6. The configuration is substantially equal to that of Emdodiment 5 except that a mean value calculating circuit 32 is disposed immediately after the center value calculating circuit 24.

In Embodiment 6, a maximum count value obtained before the counter 3 is reset is sequentially fed to the center value calculating circuit 24. Then, a value which is obtained by multiplying the maximum count values by ½ is outputted to a mean value calculating circuit 32. The mean value calculating circuit 32 calculates a mean value after it receives a plurality of center values from the center value calculating circuit 24. The mean value is outputted as a center value which functions as the first reference value.

The other components are substantially equivalent to those of Emdodiment 5. Like reference numerals designate like components to those of Emdodiment 5, and the description of the components is omitted for simplicity.

In Emdodiment 6 a plurality of count values are fed to the mean value calculating circuit 32 via the center value calculating circuit 24, and the mean value thereof is obtained, so that it is possible to obtain the center value more precisely.

EMBODIMENT 7

In all of Embodiments 1 to 6, the correcting data is supplied to only the first half of the period of the basic parabolic wave, in synchronism with the vertical synchronizing signal. In constant, in Emdodiment 7, positional information (timing information) indicating a position at which the correction is to be started is supplied so that the basic parabolic wave is corrected by adding the correcting data at any position within one vertical scanning period.

Figure 12:
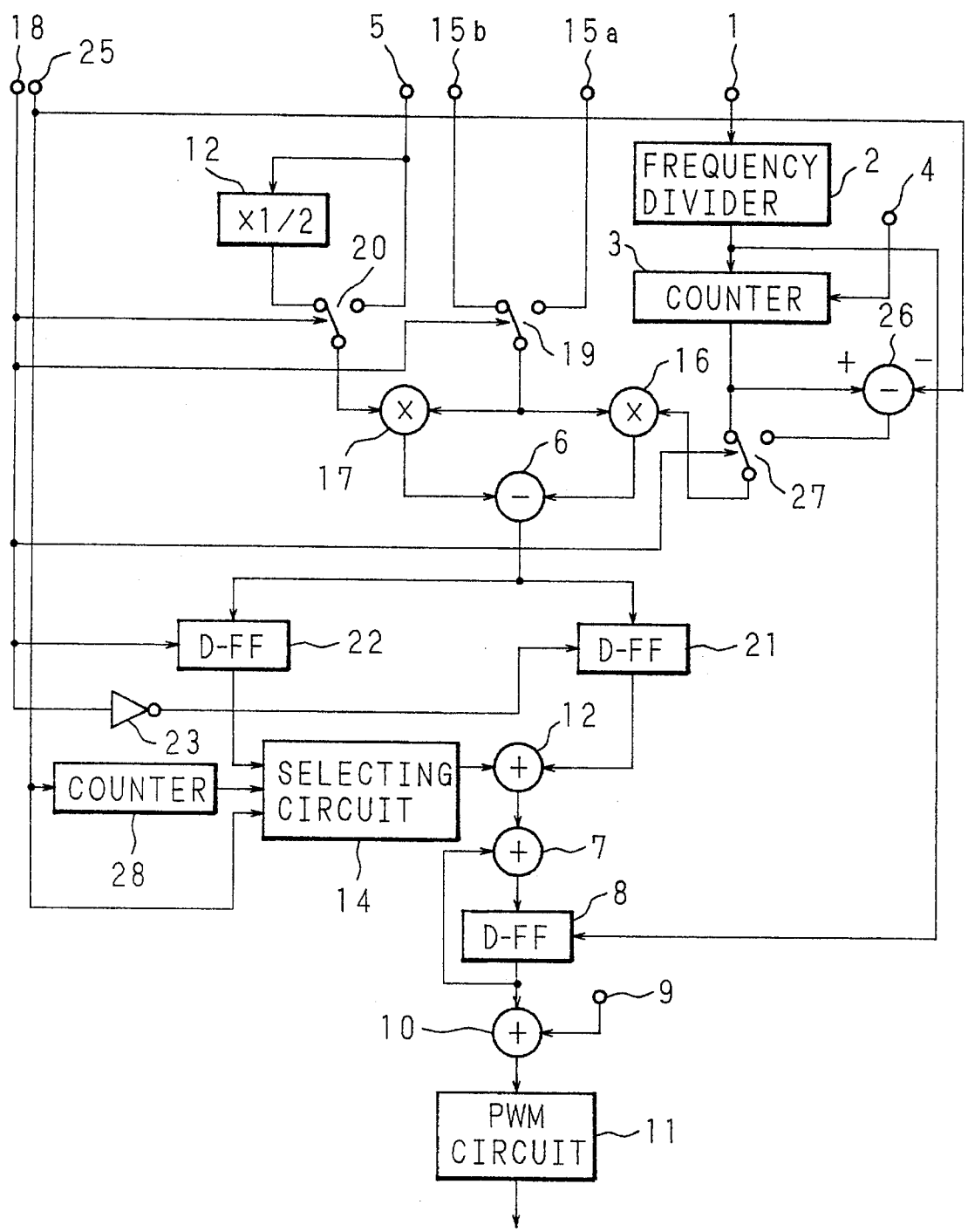
FIG. 12 is a block diagram showing the configuration of Embodiment 7.

FIG. 12 is a block diagram showing the configuration of Embodiment 7. A selection switch 27 and a subtracter 26 are disposed between a counter 3 and a multiplier 16. The switching operation of the selection switch 27 is controlled in accordance with a waveform data switching signal. The count value of the counter 3 is supplied to one of the input terminals of the subtracter 26, and also to the selection switch 27. The other input terminal of the subtracter 26 receives addition start-position data which is correcting data supplied to an input terminal 25. The subtracted value which is outputted from the subtracter 26 is supplied to the selection switch 27. The selection switch 27 is switched in accordance with a switching signal which is inputted from an input terminal 18, so that one of the count value from the counter 3 and the subtracted value from the subtracter 26 is selectively supplied to the multiplier 16.

The aforementioned addition start-position data is inputted into a selecting circuit 14 directly or via a counter 28. The counter 28 performs the count operation during a period in which the correcting data functioning as the addition start-position data is applied, i.e., during a half of the period of the basic parabolic wave. When the count operation period is terminated, the counter 28 sends a carry out signal to the selecting circuit 14. The selecting circuit 14 acquires the timing information related to the start and end positions of the adding operation, from the start-position data and the carry out signal from the counter 28. When the operation of adding data is not performed, the selecting circuit 14 outputs "0". When the adding operation is performed, the selecting circuit 14 outputs a value as it is which is held by the flip-flop circuit 22.

The other components are substantially equivalent to those of Emdodiment 4. Like reference numerals designate like components to those in Emdodiment 4, and the description of the components is omitted for simplicity.

In Emdodiment 7 it is possible to obtain, as the output of the whole circuit, a value in which data for one period of the correcting-use parabolic wave having a desired amplitude and a period equal to a half of that of the basic parabolic wave is added at an arbitrary position within one vertical scanning period.

EMBODIMENT 8

In all of Embodiments 1 to 7, the center value functioning as the reference value for the correcting-use parabolic wave has a fixed period equal to a half of the period of the basic parabolic wave. In Emdodiment 8, the center value of the correcting-use parabolic wave is externally supplied.

Figure 13:
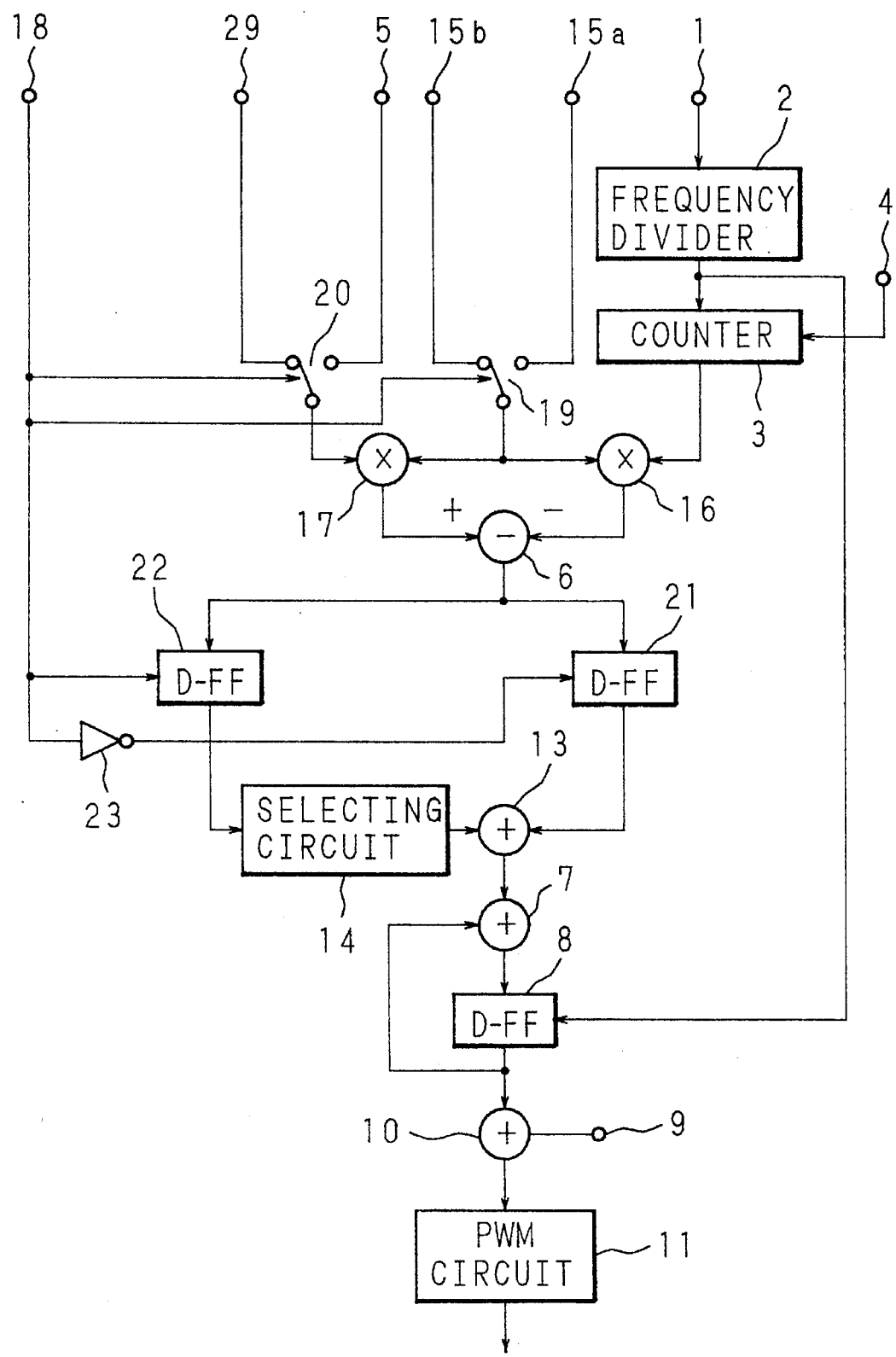
FIG. 13 is a block diagram showing the configuration of Embodiment 8.

FIG. 13 is a block diagram showing the configuration of Embodiment 8. The compression circuit 12 used in Emdodiment 4 shown in FIG. 9 is not provided. One input terminal of a selection switch 20 is connected to an input terminal 5 through which the center value functioning as a first reference value is supplied. The other input terminal of the selection switch 20 is connected to an input terminal 29 through which an arbitrary center value functioning as a second reference value of the correcting-use parabolic wave is supplied.

The other components are substantially equivalent to those of Emdodiment 4 shown in FIG. 9. Like reference numerals designate like components to those of Emdodiment 4, and the description of the components is omitted for simplicity.

In Emdodiment 8 the center-value data of the correcting-use parabolic wave is externally inputted through the input terminal 29, so that it is possible to produce data of a correcting-use parabolic wave in which the amplitude and the center value are independent of those of the basic parabolic wave, and which is synchronized with one vertical synchronizing signal in one vertical scanning period.

EMBODIMENT 9

Unlike Emdodiment 3 in which the gains of the basic parabolic wave and the correcting-use parabolic wave are independently varied, in Emdodiment 9 after the correction of the parabolic wave data is completed, the gain of the parabolic wave data is varied.

Figure 14:
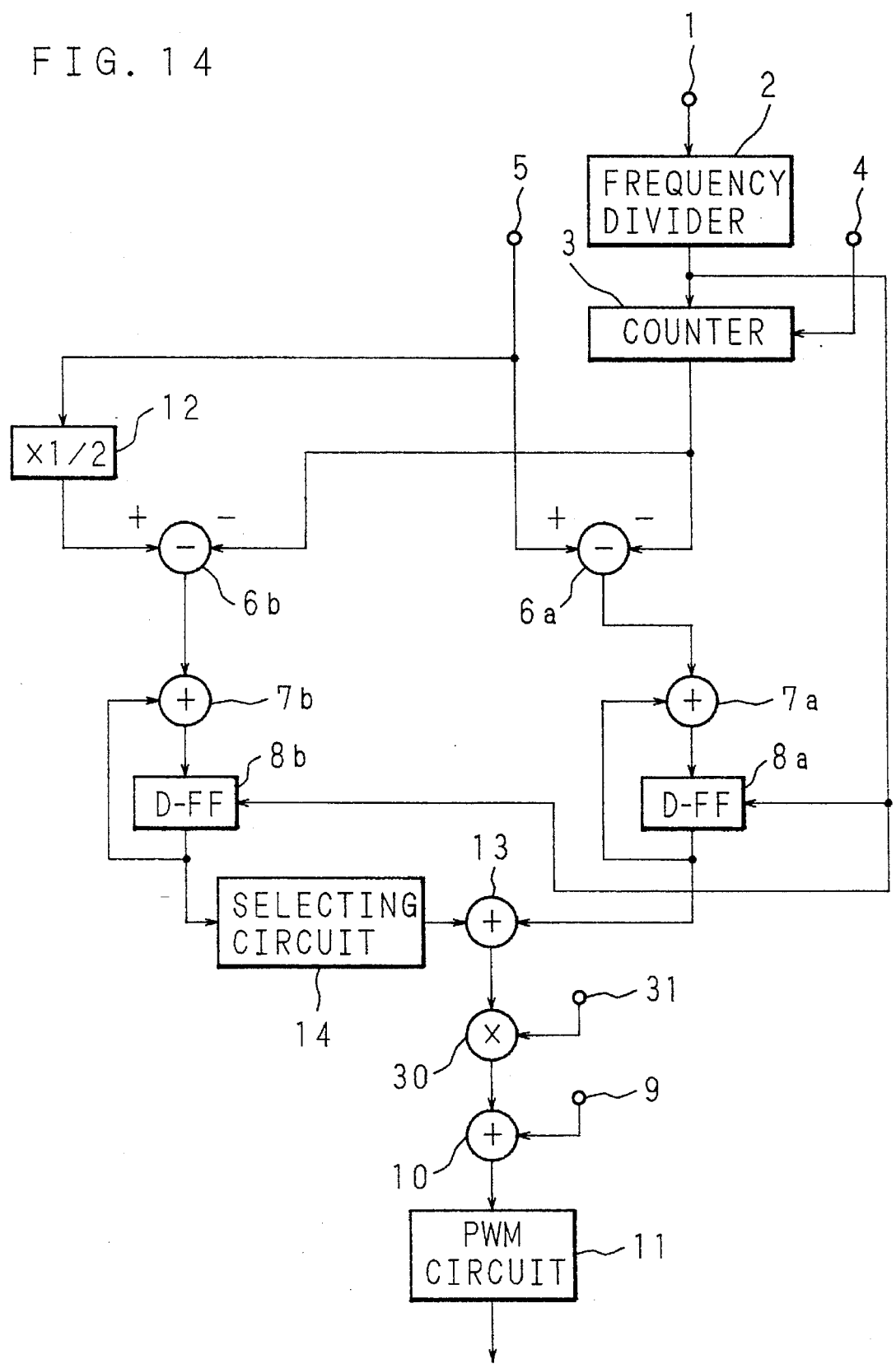
FIG. 14 is a block diagram showing the configuration of Emdodiment 9.

FIG. 14 is a block diagram showing the configuration of Embodiment 9. The configuration of Emdodiment 9 is substantially equal to that of Emdodiment 1 shown in FIG. 5 except that a multiplier 30 is inserted between the adders 13 and 10. The multiplier 30 multiplies the added value from the adder 13 by an amplitude gain signal for the whole circuit inputted from an input terminal 31. The multiplied result is amplified or compressed, and then outputted to the adder 10.

The other components are substantially equivalent to those in Emdodiment 1. Like reference numerals designate like components to those of Emdodiment 1, and the description of the components is omitted for simplicity.

In Emdodiment 9 the circuit configuration can be more simplified as compared with the that shown in Emdodiment 3, and moreover the same effects as those of Emdodiment 3 can be attained.

As an alternative embodiment, the multiplier 30 can also be inserted between the adders 13 and 7 of Emdodiment 2, shown in FIG.7, in a manner similar to Emdodiment 9 shown in FIG. 14.

As described above, according to the present invention, a first difference which is a difference between a value obtained on the basis of a first reference value and a value obtained on the basis of a count value of basic clock pulses, and a second difference which is a difference between a value obtained on the basis of a second reference value and a value obtained on the basis of the count value are respectively obtained. Each of the differences is individually integrated. Then, the integrated values are totalled. A PWM signal is generated from the sum. As a result, the data can be previously corrected in anticipation of an influence due to the integration of the PWM signal, so that it is possible to precisely eliminate deflection distortion.

Alternatively, the first difference and the second difference are totalled, and then the added value is integrated. Then, the PWM signal is obtained from the integrated value. As a result, the process and the circuit configuration can be simplified.

When a first amplitude gain and a second amplitude gain are respectively set for the basic parabolic wave data and the correcting-use parabolic wave data, moreover, it is possible to voluntarily set and control the amplitude of the parabolic wave to be outputted. Thus, it is possible to output a parabolic wave having more desired features.

Moreover, the first and second reference values and the first and second amplitude gains are respectively time-division multiplexed, and then subjected to the process using the count value, thereby obtaining the time-division multiplexed first and second differences. Thereafter, the time-division multiplexed differences are separated into a first difference and a second difference. Thus, it is possible to greatly simplify the circuit configuration.

Since the means for calculating the first and second reference values from a count value obtained by the means for counting the clock pulse is provided, moreover, it is unnecessary to externally supply the first and second reference values. Thus, the external circuit can be simplified.

Since the first and second reference values are obtained on the basis of a plurality of count values which are obtained by counting the clock pulses, the first and the second reference values are improved in precision.

Moreover, on the basis of the time information indicating the time at which the correction is to be started, the correction can be applied at an arbitrary position. Thus, it is possible to obtain a predetermined parabolic wave.

Moreover, the compression or amplification of the sum of integrated values of the first and second differences or the integrated value of the sum of the first and second differences can attain an effect that the gain adjustment for the entire parabolic wave can easily be performed.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A deflection distortion correcting circuit comprising:

counting means for counting basic clock pulses in synchronism with a vertical synchronizing signal and outputting a count value;

first-difference calculating means for sequentially calculating a first-difference value based on said count value and a first reference value, said first-difference calculating means determining a period of a basic parabolic wave;

second-difference calculating means for sequentially calculating a second difference value based on said count value and a second reference value, said second-difference calculating means determining a period of a correcting-use parabolic wave;

means for integrating said first difference value and outputting a first integrated value;

means for integrating said second difference value and outputting a second integrated value;

integrated-value adding means for calculating a sum of said first integrated value and said second integrated value;

means for generating a pulse width modulation signal based on said sum; and means for integrating said pulse width modulation signal and outputting a signal for correcting a deflection distortion.

2. A deflection distortion correcting circuit comprising:

counting means for counting basic clock pulses in synchronism with a vertical synchronizing signal and outputting a count value;

first-difference calculating means for sequentially calculating a first difference value based on count value and a first reference value, said first-difference calculating means determining a period of a basic parabolic wave;

second-difference calculating means for sequentially calculating a second difference value based on a second reference value and said count value, said second-difference calculating means determining a period of a correcting-use parabolic wave;

difference adding means for calculating a sum of said first difference value and said second difference value;

difference-sum integrating means for integrating said sum;

means for generating a pulse width modulation signal based on said integrated sum; and means for integrating said pulse width modulation signal and outputting a signal for correcting deflection distortion.

3. The deflection distortion correcting circuit according to claim 1, further comprising:

first multiplying means for multiplying said count value by a first amplitude gain, and outputting a first multiplied value; and second multiplying means for multiplying said first reference value by said first amplitude gain and outputting a second multiplied value;

third multiplying means for multiplying said count value by a second amplitude gain and outputting a third multiplied value; and fourth multiplying means for multiplying said second reference value by said second amplitude gain and outputting a fourth multiplied value, wherein said first-difference calculating means calculates said first-difference value based on said first and second multiplied values, and said second-difference calculating means calculates said second-difference value based on said third and fourth multiplied values.

4. The deflection distortion correcting circuit according to claim 2, wherein said first difference calculating means includes first multiplying means for multiplying said count value by a first amplitude gain and outputting a first multiplied value, and second multiplying means for multiplying said first reference value by said first amplitude gain and outputting a second multiplied value, wherein said first-difference calculating means calculates said first difference value based on said first multiplied value and said second multiplied value, and said second difference calculating means includes third multiplying means for multiplying said count value by a second amplitude gain and outputting a third multiplied value, and fourth multiplying means for multiplying said second reference value by said second amplitude gain and outputting a fourth multiplied value, wherein said second-difference calculating means calculates said second difference value based on said third multiplied value and said fourth multiplied value.

5. A deflection distortion correcting circuit comprising:

counting means for counting basic clock pulses in synchronism with a vertical synchronizing signal and outputting a count value;

means for time-division multiplexing a first amplitude gain and a second amplitude gain;

means for time division multiplexing a first reference value and a second reference value;

first multiplying means for multiplying said count value by said first and second time-division multiplexed amplitude gains, said first multiplying means outputting a first multiplied value;

second multiplying means for multiplying said time-division multiplexed first and second reference values by said first and second time-division multiplexed amplitude gains, said second multiplying means outputting a second multiplied value;

difference calculating means for calculating a difference value based on said first multiplied value and said second multiplied value;

means for separating said calculated difference value into at least first and second values;

means for adding said at least first and second values to produce an added value;

means for integrating said added value to produce an integrated value; means for generating said pulse width modulation signal based on said integrated value; and means for integrating said pulse width modulation signal and outputting a signal for correcting deflection distortion.

6. The deflection distortion correcting circuit according to claim 1, wherein said counting means previously counts said basic clock pulses over a single vertical scanning period, and said first and second reference values are calculated in accordance with said previously counted basic clock pulses.

7. The deflection distortion correcting circuit according to claim 2, wherein said counting means previously counts said basic clock pulses over a single vertical scanning period, and said first and second reference values are calculated in accordance with said previously counted basic clock pulses.

8. The deflection distortion correcting circuit according to claim 3, wherein said counting means previously counts said basic clock pulses over a vertical scanning period, and said first and second reference values are calculated in accordance with said previously counted basic clock pulses.

9. The deflection distortion correcting circuit according to claim 4, wherein said counting means previously counts said basic clock pulses over a vertical scanning period, and said first and second reference values are calculated in accordance with said previously counted basic clock pulses.

10. The deflection distortion correcting circuit according to claim 5, wherein said counting means previously counts said basic clock pulses over a vertical scanning period, and said first and second reference values are calculated in accordance with said previously counted basic clock pulses.

11. The deflection distortion correcting circuit according to claim 1, wherein said counting means previously counts said basic clock pulses over a vertical scanning period for each of a plurality of vertical scanning periods, and said first and second reference values are calculated in accordance with each of said previously counted basic clock pulses.

12. The deflection distortion correcting circuit according to claim 2, wherein said counting means previously counts said basic clock pulses over a single vertical scanning period for each of a plurality of vertical scanning periods, and said first and second reference values are calculated in accordance with each of said previously counted basic clock pulses.

13. The deflection distortion correcting circuit according to claim 3, wherein said counting means previously counts said basic clock pulses over a single vertical scanning period for each of a plurality of vertical scanning periods, and said first and second reference values are calculated in accordance with each of said previously counted basic clock pulses.

14. The deflection distortion correcting circuit according to claim 4, wherein said counting means previously counts said basic clock pulses over a single vertical scanning period for each of a plurality of vertical scanning periods, and said first and second reference values are calculated in accordance with each of said previously counted basic clock pulses.

15. The deflection distortion correcting circuit according to claim 5, wherein said counting means previously counts said basic clock pulses over a single vertical scanning period for each of a plurality of vertical scanning periods, and said first and second reference values are calculated in accordance with each of said previously counted basic clock pulses.

16. The deflection distortion correcting circuit according to claim 2, wherein said difference adding means includes means for specifying a timing at which said second difference value is to be added to said first difference value.

17. The deflection distortion correcting circuit according to claim 1, further comprising:
   means for compressing or amplifying said sum obtained from said integrated-value adding means.

18. The deflection distortion correcting circuit according to claim 2, further comprising:
   means for compressing or amplifying said sum obtained from said difference adding means.

19. A deflection distortion correcting circuit of claim 1, wherein said vertical synchronizing signal is separated from an image signal.

20. A deflection distortion correcting circuit of claim 2, wherein said vertical synchronizing signal is separated from an image signal.

21. A deflection distortion correcting circuit of claim 5, wherein said vertical synchronizing signal is separated from an image signal.

22. A method for correcting a deflection distortion, comprising:
   (a) counting a number of clock pulses within a predetermined period of a vertical synchronizing signal;
   (b) calculating a first value based on said counted number and a first reference value for determining a period of basic parabolic wave;
   (c) calculating a second value based on said counted number and a second reference value for determining a period of a correcting-use parabolic wave;
   (d) integrating said first value;
   (e) integrating said second value;
   (f) calculating a third value based on said integrated first and second values;
   (g) modulating said calculated third value to obtain a fourth value; and
   (h) integrating said fourth value for obtaining a signal for correcting a deflection distortion.

23. The method of claim 22, wherein said step (b) comprises calculating a difference between said counted number and said first reference value to obtain said first value.

24. The method of claim 22, wherein said step (c) comprises
calculating a difference between said counted number and said second reference value to obtain said second value.

25. The method of claim 22, wherein said step (f) comprises
   adding said integrated first and second values to obtain said third value.

26. The method of claim 22, further comprising:
   (i) adding said integrated first and second values when said integrated second value is equal to or greater than zero.

27. The method of claim 22, further comprising:
   (i) compressing said first reference value to obtain said second reference value.

28. The method of claim 22, wherein
said step (b) includes
   (b1) multiplying said counted number and a first amplitude gain to obtain a first multiplied value,
   (b2) multiplying said first reference value and said first amplitude gain to obtain a second multiplied value, and
   (b3) calculating a difference between said first and second multiplied values to obtain said first value,
   and said step (c) includes
   (c1) multiplying said counted value and a second amplitude gain to obtain a third multiplied value,
   (c2) multiplying said second reference value and said second amplitude gain to obtain a fourth multiplied value, and
   (c3) calculating a difference between said third and fourth multiplied values to obtain said second value.

29. A method for correcting a deflection distortion, comprising:
   (a) counting a number of clock pulses within a predetermined period of a vertical synchronizing signal;
   (b) calculating a first value based on said counted number and a first reference value for determining a period of a basic parabolic wave;
   (c) calculating a second value based on said counted number and a second reference value for determining a period of a correction-use parabolic wave;
   (d) calculating a third value based on said first and second values;
   (e) integrating said third value;
   (f) modulating said integrated third value to obtain a fourth value; and
   (g) integrating said fourth value for obtaining a signal for correcting a deflection distortion.

30. The method of claim 29, wherein said step (b) comprises
   calculating a difference between said counted number and said first reference value to obtain said first value.

31. The method of claim 29, wherein said step (c) comprises
   calculating a difference between said counted number and said second reference value to obtain said second value.

32. The method of claim 29, wherein said step (d) comprises
   adding Said first and second values to obtain said third value.

33. The method of claim 29, further comprising:
   (h) adding said first and second values when said second value is equal to or greater than zero.

34. The method of claim 29, further comprising:

(i) compressing said first reference value to obtain said second reference value.

35. A method for correcting a deflection distortion, comprising:

(a) counting a number of clock pulses within a predetermined period of a vertical synchronizing signal;

(b) switching between a first amplitude gain and a second amplitude gain in response to a switching signal;

(c) switching between a first reference value and a second reference value in response to said switching signal;

(d) multiplying said counted number by said first or second amplitude gain to obtain a first value;

(e) multiplying said first or second amplitude gain by said first or second reference value to obtain a second value;

(f) calculating a third value based on said first and second values;

(g) producing an integrated third value based on said third value;

(h) modulating said integrated third value to obtain a fourth value; and (i) integrating said fourth value for obtaining a signal for correcting a deflection distortion.

36. The method of claim 35, wherein said step (g) includes (g1) inputting said third value to a first flip-flop triggered by said switching signal to obtain a fifth value, (g2) inputting said third value to a second flip-flop triggered by an inverted switching signal to obtain a sixth value, and (g3) adding said fifth and sixth values to obtain a modified third value.

37. The method of claim 36, further comprising:

(j) adding said sixth value to said fifth value when said fifth value is equal to or greater than zero.

38. The method of claim 35, wherein said step (f) includes calculating a difference between said first and second values to obtain said third value.

* * * * *